United States Patent
Grasso et al.

(10) Patent No.: US 6,428,916 B1
(45) Date of Patent: Aug. 6, 2002

(54) COOLANT TREATMENT SYSTEM FOR A DIRECT ANTIFREEZE COOLED FUEL CELL ASSEMBLY

(75) Inventors: Albert P. Grasso, Vernon, CT (US); Richard D. Breault, North Kingstown, RI (US); Leslie L. Van Dine, Manchester, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 0 days.

(21) Appl. No.: 09/468,027

(22) Filed: Dec. 20, 1999

(51) Int. Cl.$^7$ ................................................ H01M 8/04
(52) U.S. Cl. ............................ 429/13; 429/26; 429/34
(58) Field of Search ............................ 429/13, 17, 26, 429/34

(56) References Cited

U.S. PATENT DOCUMENTS

| | | | |
|---|---|---|---|
| 3,801,372 A | * 4/1974 | Shaw | 429/26 |
| 3,969,145 A | 7/1976 | Grevstad et al. | 136/86 |
| 3,994,748 A | 11/1976 | Kunz et al. | 429/13 |
| 4,233,369 A | 11/1980 | Breault et al. | 429/26 |
| 4,344,850 A | 8/1982 | Grasso | 210/664 |
| 4,769,297 A | 9/1988 | Reiser et al. | 429/17 |
| 4,801,356 A | 1/1989 | Grasso | 203/11 |
| 4,804,591 A | 2/1989 | Grasso et al. | 429/12 |
| 4,816,040 A | 3/1989 | Bonville et al. | 55/42 |
| 4,835,072 A | * 5/1989 | Grasso et al. | 429/26 X |
| 4,855,192 A | * 8/1989 | Grasso | 429/13 |
| 4,973,529 A | 11/1990 | Grasso et al. | 429/12 |
| 5,503,944 A | 4/1996 | Meyer et al. | 429/13 |
| 5,605,770 A | * 2/1997 | Andreoli et al. | 429/26 X |
| 6,013,385 A | * 1/2000 | DuBose | 429/26 |
| 6,207,308 B1 | * 3/2001 | Grasso et al. | 429/26 |

* cited by examiner

Primary Examiner—Stephen J. Kalafut
(74) Attorney, Agent, or Firm—McCormick, Paulding & Huber

(57) ABSTRACT

A coolant treatment system for a direct antifreeze cooled fuel cell power plant including a degassifier for providing interaction between an oxidant and an antifreeze solution which has circulated throughout the fuel cell power plant so that dissolved gases within the antifreeze solution are removed. The fuel cell power plant is configured to allow the antifreeze solution to be in direct fluid communication with the fuel cell assemblies comprising the fuel cell power plant.

19 Claims, 3 Drawing Sheets

COOLANT TREATMENT SYSTEM FOR A DIRECT ANTIFREEZE COOLED FUEL CELL ASSEMBLY

FIELD OF THE INVENTION

This invention relates in general to a coolant treatment system for a fuel cell assembly, and deals more particularly with a coolant treatment system for a fuel cell assembly which is in direct communication with an antifreeze coolant solution.

BACKGROUND OF THE INVENTION

Electrochemical fuel cell assemblies are known for their ability to produce electricity and a subsequent reaction product through the interaction of a fuel being provided to an anode and an oxidant being provided to a cathode, thereby generating an external current flow between these substrates. Such fuel cell assemblies are very useful and sought after due to their high efficiency, as compared to internal combustion fuel systems and the like. Fuel cell assemblies are additionally advantageous due to the environmentally friendly chemical reaction by-products that are produced, such as water. In order to control the temperature within the fuel cell assembly, a water coolant is typically provided to circulate about the fuel cell assembly. The use of reformed fuels within fuel cell assemblies makes them particularly sensitive to possible water contaminants.

Electrochemical fuel cell assemblies typically employ hydrogen as the fuel and oxygen as an oxidant where the reaction by-product is water. Such fuel cell assemblies may employ a membrane consisting of a solid polymer electrolyte, or ion exchange membrane, disposed between the two substrates formed of porous, electrically conductive sheet material—typically, carbon fiber paper. The ion exchange membrane is also known as a proton exchange membrane (hereinafter PEM), such as sold by DuPont under the trade name NAFION™. Catalyst layers are formed between the membrane and the substrates to promote the desired electrochemical reaction. The combination of the PEM, the two catalyst layers and the substrates are referred to as a membrane electrode assembly.

In operation, hydrogen fuel permeates the porous substrate material of the anode and reacts with the catalyst layer to form hydrogen ions and electrons. The hydrogen ions migrate through the membrane to the cathode and the electrons flow through an external circuit to the cathode. At the cathode, the oxygen-containing gas supply also permeates through the porous substrate material and reacts with the hydrogen ions and the electrons from the anode at the catalyst layer to form the by-product water. Not only does the ion exchange membrane facilitate the migration of these hydrogen ions from the anode to the cathode, but the ion exchange membrane also acts to isolate the hydrogen fuel from the oxygen-containing gas oxidant. The reactions taking place at the anode and cathode catalyst layers are represented by the equations:

Anode reaction: 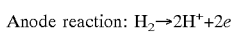

Cathode reaction: 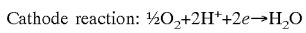

Conventional PEM fuels cells have the ion exchange membrane positioned between two gas-permeable, electrically conductive plates, referred to as the anode and cathode plates. The plates are typically formed from graphite, a graphite-polymer composite, or the like. The plates act as a structural support for the two porous, electrically conductive substrates, as well as serving as current collectors and providing the means for carrying the fuel and oxidant to the anode and cathode, respectively. They are also utilized for carrying away the reactant by-product water during operation of the fuel cell.

When flow channels are formed within these plates for the purposes of feeding either fuel or oxidant to the anode and cathode plates, they are referred to as "fluid flow field plates". These plates may also function as water transfer plates in certain fuel cell configurations. When these plates simply overlay channels formed in the anode and cathode porous material, they are referred to as "separator plates". Moreover, the plates may have formed therein reactant feed manifolds which are utilized for supplying fuel to the anode flow channels or, alternatively, oxidant to the cathode flow channels. They also have corresponding exhaust manifolds to direct unreacted components of the fuel and oxidant streams, and any water generated as a by-product, from the fuel cell. Alternatively, the manifolds may be external to the fuel cell itself, as shown in commonly owned U.S. Pat. No. 3,994,748, issued to Kunz et al., and incorporated herein by reference in its entirety.

The catalyst layer in a fuel cell assembly is typically a carbon supported platinum or platinum alloy, although other noble metals or noble metal alloys may be utilized. Multiple electrically connected fuel cells consisting of two or more anode plate/membrane electrode assembly/cathode plate combinations are referred to as a "fuel cell stack". A fuel cell stack is typically electrically connected in series.

Recent efforts at producing the fuel for fuel cell assemblies have focused on utilizing a hydrogen rich gas produced from the chemical conversion of hydrocarbon fuels, such as methane, natural gas, gasoline or the like, into hydrogen. This process requires that the hydrogen produced must be efficiently converted to be as pure as possible, thereby ensuring that a minimal amount of carbon monoxide and other undesirable chemical byproducts are produced. This conversion of hydrocarbons is generally accomplished through the use of a steam reformer or an autothermal reformer. Reformed hydrocarbon fuels frequently contain quantities of ammonia, $NH_3$, as well as significant quantities of carbon dioxide, $CO_2$. These gases tend to dissolve and dissociate into the water which is provided to, and created within, the fuel cell assembly. The resultant contaminated water supply may cause the conductivity of the water to increase to a point where shunt current corrosion occurs in the coolant channels and manifold leading to degradation of fuel cell materials, as well as reducing the conductivity of the PEM and thereby reducing the efficiency of the fuel cell assembly as a whole.

As disclosed above, the anode and cathode plates provide coolant channels for the circulation of a water coolant, as well as for the wicking and carrying away of excessive water produced as a by-product of the fuel cell assembly operation. The water so-collected and circulated through a fuel cell assembly is susceptible to water contamination and may therefore damage and impair the operation of the fuel cell assembly as the contaminated water circulates throughout the fuel cell assembly.

It is therefore necessary to provide a system which may protect the fuel cell assembly from water contamination, such as is described in commonly owned U.S. Pat. No. 4,344,850, issued to Grasso, and incorporated herein by reference in its entirety. Grasso's system for treating the coolant supply of a fuel cell assembly, as illustrated in FIG. 1 of 4,344,850, utilizes a filter and demineralizer for purifying a portion of the coolant supplied to the fuel cell assembly. A deaerator is also utilized to process the condensed water obtained from a humidified cathode exit stream. As discussed in Grasso, the heat exchange occurring between the coolant stream and the body of the fuel cell assembly is accomplished according to commonly assigned U.S. Pat. No. 4,233,369, issued to Breault et al., incorporated herein by reference in its entirety.

It is important to note that Grasso's coolant system does not provide for the cleansing of the coolant stream as a whole. This is due to the fact that the coolant conduits in Grasso, being fashioned from copper or the like, are not in diffusable communication with the body of the fuel cell assembly and as such, the coolant stream does not receive contamination from, inter alia, the $CO_2$ or $NH_3$ present in the reformed fuel stream. The burden of cleansing the coolant stream in Grasso is therefore born solely by the filter and demineralizer and results in greater wear on these components and hence greater repairs and replacements. Grasso also utilizes two distinct coolant pumps for circulating the coolant.

Another coolant treatment system has been disclosed in commonly assigned Issued U.S. Pat. No. 6,207,308, entitled "Water Treatment System for a Fuel Cell Assembly", herein incorporated by reference in its entirety. U.S. Pat. No. 6,207,732 utilizes a unique arrangement of demineralizers and degasifiers to cleanse the entire circulating coolant stream while providing for the humidification of an inputted oxidant stream.

In addition to water treatment concerns, the operation of a typical PEM fuel cell may also be adversely affected by extremes in environmental conditions, such as when the operating environment of the PEM fuel cell falls below the freezing point of water. In such circumstances, the volumetric expansion of the water coolant may cause severe damage to the PEM fuel cell. Commonly assigned co-pending U.S. patent application, Ser. No. 09/322,733, entitled "Method and Apparatus for Thermal Management of a Fuel Cell Assembly", now U.S. Pat. No. 6,248,462, herein incorporated by reference in its entirety, addresses this additional concern.

U.S. Pat. No. 6,248,462, provides a fuel cell assembly with a cooler plate having channels formed therein for carrying an antifreeze solution, such as a glycol solution or the like, for maintaining the fuel cell assembly above freezing, and alternatively, for quickly raising the fuel cell assembly above freezing during times of cold start-ups. The cooler plate is sealed from communication with the substrate of the fuel cell assembly to protect against contamination of the substrate and catalyst materials and subsequent failing of the fuel cell assembly as a whole. The addition of a cooler plate in a fuel cell assembly creates an associated increase in the weight and volume of the fuel cell assembly which is only exacerbated when a plurality of planar fuel cell assemblies are joined together to form a fuel cell stack. This increase in both weight and volume is especially troublesome and undesirable in applications involving fuel cell powered vehicles and the like.

Accordingly, commonly assigned co-pending U.S. patent application Ser. No. 09/359,475, entitled "Direct Antifreeze Cooled Fuel Cell", now U.S. Pat. No. 6,316,135, herein incorporated by reference in its entirety, discloses a coolant system for use with a fuel cell assembly whereby an antifreeze solution is in fluid communication with the fuel cell assembly, but is kept from contaminating the electrolyte and catalyst through a judicious balance of pressures within the fuel cell assembly and the wetproofing of certain constituent elements of the fuel cell assembly.

With the forgoing problems and concerns in mind, it is the general object of the present invention to provide a fuel cell assembly with a coolant treatment system which overcomes the above-described drawbacks. Accordingly, an integrated coolant treatment system is proposed having an antifreeze cooling solution which is not isolated from the components of the fuel cell assembly, and which also minimizes the accumulation of pure water within the fuel cell assembly.

SUMMARY OF THE INVENTION

It is an object of the present invention to provide a coolant treatment system for a fuel cell assembly.

It is another object of the present invention to reduce the levels of contaminants within the coolant circulating throughout a fuel cell assembly.

It is another object of the present invention to provide a coolant treatment system which also humidifies the oxidant flows to the cathode of a fuel cell assembly.

It is another object of the present invention to reduce the possibility of contaminating gas build-up within the coolant system.

It is another object of the present invention to protect a fuel cell assembly from the debilitating effects of freezing temperatures.

It is another object of the present invention to reduce the weight and volume of a fuel cell assembly which is protected against freezing temperatures.

It is another object of the present invention to provide a fuel cell assembly with an antifreeze coolant solution which is in direct fluid communication with the fuel cell assembly.

According to one embodiment of the present invention, a coolant treatment system for a fuel cell power plant has a plurality of electrochemical fuel cell assemblies in electrical connection with each other, the fuel cell assemblies each having an electrolyte, an anode, a cathode. The anode and the cathode are each adapted to support anode and cathode water transport plates through which a fuel and an oxidant are fed to the anode and the cathode, respectively. In addition, one of the anode and the cathode water transport plates is adapted to support a coolant channel through which an antifreeze solution is circulated. The antifreeze solution is in fluid communication with one of said anode and cathode water transport plates.

An oxidant source is utilized to provide the fuel cell power plant with the oxidant, while a coolant conduit exhausts the antifreeze solution from the fuel cell power plant.

In operation, a degasifying apparatus treats the antifreeze solution from the coolant conduit together with the oxidant from the oxidant source by removing contaminants from the antifreeze solution and by humidifying the oxidant. The degasifying apparatus subsequently provides the fuel cell power plant with the humidified oxidant.

These and other objectives of the present invention, and their preferred embodiments, shall become clear by consideration of the specification, claims and drawings taken as a whole.

DETAILED DESCRIPTION OF THE PREFERRED EMBODIMENT

Figure 1:
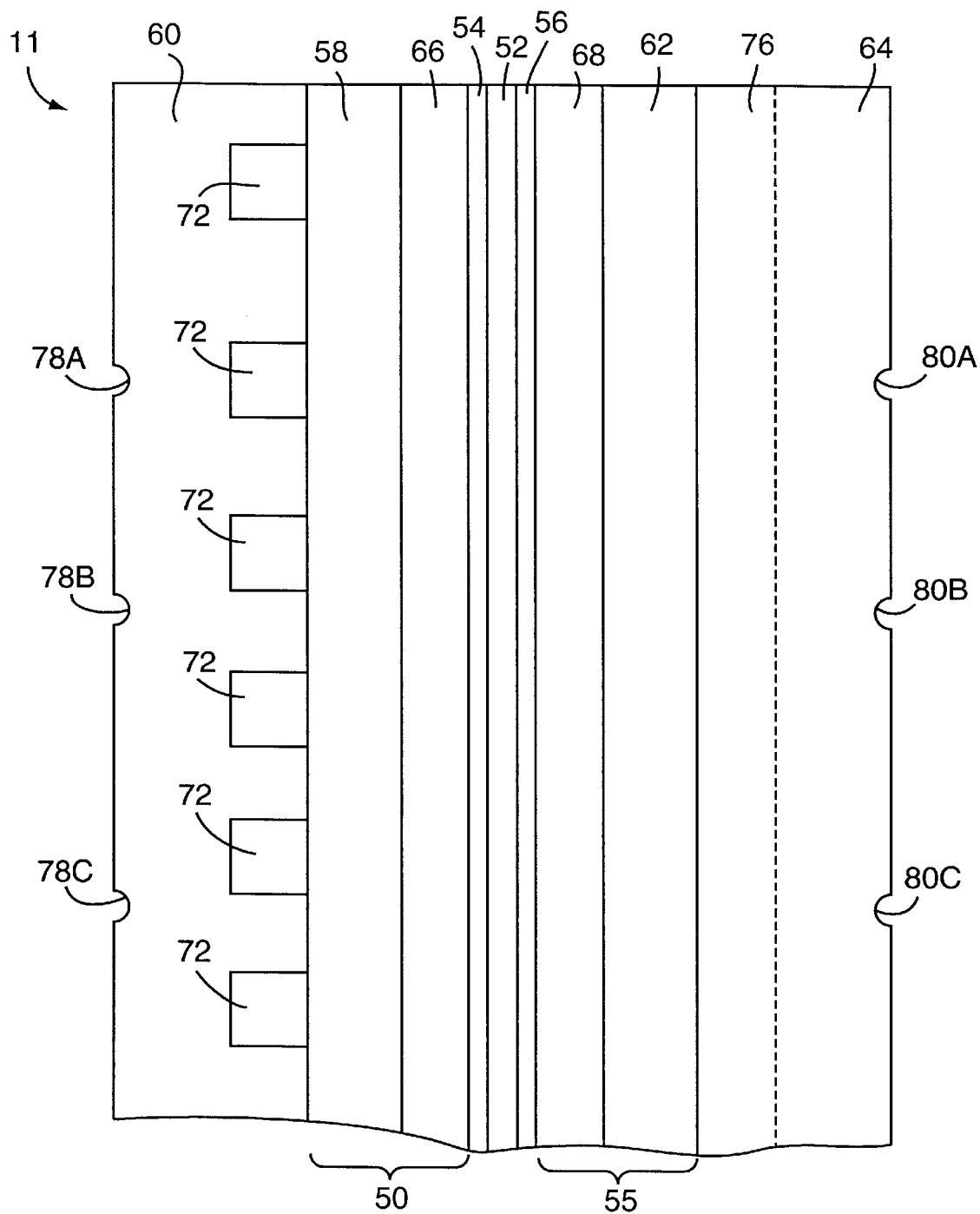
FIG. 1 illustrates a section taken through a PEM fuel assembly incorporating an antifreeze coolant solution in direct fluid communication with the fuel cell assembly.

FIG. 1 illustrates a partial cross-sectional view of a fuel cell assembly 11 which, as a component of an overall coolant treatment system (to be described later), is capable of being in direct fluid communication with an antifreeze coolant solution without suffering the detrimental effects of such a solution. The fuel cell assembly 11 typically produces only approximately 0.60–0.7 V, therefore, in order to produce a desired power supply, it is necessary for a great many fuel cells to be electrically joined together. The fuel cell assembly 11 of FIG. 1 employs an electrolyte 52 such as a proton exchange membrane ("PEM"), an anode catalyst 54 and a cathode catalyst 56 secured on opposing sides of the electrolyte 52. The fuel cell assembly 11 also includes a wet-proofed anode support means 50 that is secured in direct fluid communication with the anode catalyst 54 between an anode water transport plate 60 and the anode catalyst 54 for feeding the reactant fuel stream adjacent to the anode catalyst 54. The wet-proofed anode support means 50 may include one or more porous layers, such as a porous anode substrate 58, a porous anode diffusion layer 66, or both the porous anode substrate 58 and porous anode diffusion layer 66 secured adjacent each other between the anode water transport plate 60 and anode catalyst 54, wherein at least one of the porous layers, 58 and 66 respectively, is wetproofed.

As utilized in the present application, 'wetproofed', is a term of art whereby a constituent element of the fuel cell assembly 11 is immersed in a water repellant emulsion, such as Teflon® (polytetrafluoroethylene) or the like, and subsequently heated in a manner known to those in the art, thereby making the element so treated substantially hydrophobic.

The fuel cell assembly 11 also includes a wetproofed cathode support means 55 that is secured in direct fluid communication with the cathode catalyst 56 between a cathode water transport plate 64 and the cathode catalyst 56 for feeding a reactant oxidant stream adjacent to the cathode catalyst 56. The wetproofed cathode support means 55 may include one or more porous layers, such as a porous cathode substrate 62, a porous cathode diffusion layer 68, or both the porous cathode substrate 62 and porous cathode diffusion layer 68 secured adjacent each other between the cathode water transport plate 64 and cathode catalyst 56, wherein at least one of the porous layers, 68 and 62 respectively, is wetproofed. The porous cathode substrate 62 and porous anode substrate 58 may be porous carbon-carbon fibrous composites having a porosity of about 65% to about 75%, and may be wet-proofed by a hydrophobic substance such as Teflon® (polytetrafluoroethylene), as discussed previously.

The porous cathode water transport plate 64 is in direct fluid communication with the porous cathode substrate 62, the porous cathode diffusion layer 68 and the cathode catalyst 56. Similarly, the porous anode water transport plate 60 is in direct fluid communication with the porous anode substrate 58, the porous anode diffusion layer 66 and the anode catalyst 54.

FIG. 1 further illustrates an anode flow field which may comprise of an unillustrated fuel inlet and a plurality of fuel flow channels 72 defined within the anode water transport plate 60. Similarly, a cathode flow field may consist of an unillustrated oxidant inlet and a plurality of oxidant flow channels 76 defined within the cathode water transport plate 64. The anode flow field and cathode flow field may also consist of cavities, differing channels or grooves well known in the art and defined within fuel cell components to direct the fuel and process oxidant streams to pass in contact with the anode and cathode catalysts, 54 and 56 respectively. The porous anode and cathode water transport plates, 60 and 64, may be structured to cooperate with adjacent water transport plates (not shown) so that anode side coolant channels 78A, 78B and 78C defined within the anode water transport plate 60, and cathode side coolant channels 80A, 80B, and 80C defined within the cathode water transport plate 64, may cooperate in mirror-image association with coolant channels of the adjacent water transport plates of adjacent fuel cell assemblies (not shown), thereby forming a fuel cell stack including a network of coolant channels for delivering a coolant fluid stream to the water transport plates, 60 and 64 respectively.

The coolant fluid stream of the present invention is comprised of an antifreeze solution which, as discussed above, is in direct fluid communication with the constituent elements of the fuel cell assembly 11. The direct antifreeze solution may be any organic antifreeze solution that does not wet the wetproofed cathode substrate and that is essentially non-volatile at cell operating temperatures. For purposes of the present application, 'non-volatile' is defined to mean that the antifreeze solution sustains a loss of less than 10% of its antifreeze volume for every 500 operating hours of the fuel cell assembly at standard operating temperatures.

Alternatively, a first preferred direct antifreeze solution may be a special direct antifreeze solution having the following characteristics: 1. a freezing point of at least −20 degrees Fahrenheit (hereafter "°F."); 2. a surface tension greater than 60 dynes per centimeter (hereafter "dyne/cm") at about 150° F.; 3. a partial pressure of antifreeze above the solution at about 150° F. that is less than 0.005 mm of mercury (hereafter "mm Hg"); and, 4. that is capable of being oxidized by catalysts of the fuel cell at fuel cell voltages. A second preferred antifreeze solution may be an alkanetriol direct antifreeze solution, and, in particular, an alkanetriol selected from the group consisting of glycerol, butanetriol, and pentanetriol. The alkanetriol direct antifreeze may be an antifreeze solution containing any alkanetriol.

In operation of the fuel cell assembly 11, the anode side coolant channels 78A, 78B, 78C and cathode side coolant channels 80A, 80B, 80C are in fluid communication with the coolant feed conduit and coolant discharge conduit (described later), so that an antifreeze coolant stream from the coolant feed conduit passes through the anode and cathode coolant channels, and into the anode and cathode water transport plates, 60 and 64, to saturate the pore volume of the water transport plates, 60 and 64. The antifreeze coolant then passes into the coolant discharge conduit. By filling the open pore volume of the anode and cathode water transport plates, 60 and 64, the antifreeze solution stream forms a gas barrier or seal preventing the gaseous reactant fuel in the reactant fuel channels 72 from flowing into oxidant channels in an adjacent cell. By wetproofing the porous anode substrate 58 layer and/or the porous anode diffusion layer 66, the liquid antifreeze solution is restricted from moving out of the anode water transport plate 60 and passing through the anode substrate and diffusion layers, 58 and 66, into contact with the anode catalyst 54.

Similarly, by wetproofing the porous cathode substrate layer 62 and/or the cathode diffusion layer 68, the liquid antifreeze coolant stream is prevented from moving out of the cathode water transport plate 64 and passing through the cathode substrate 62 and cathode diffusion layer 68 and into contact with the cathode catalyst 56. Additionally, as the fuel cell assembly 11 operates, a quantity of by-product water is continually formed at the cathode catalyst 56 and is removed as water vapor or liquid into the reactant oxidant stream flowing through the cathode flow field or oxidant channels 76 defined within the cathode water transport plate 64. Moreover, a portion of the by-product water is removed from the fuel cell assembly 11 with the antifreeze coolant stream through the coolant discharge conduit (to be described in more detail later).

The pressure of the antifreeze solution is controlled to be lower than the pressure at which the reactant fuel and oxidant are circulated throughout the fuel cell assembly 11. Therefore, the migration of the by-product water occurs substantially in a direction from the cathode catalyst 56 towards the cathode water transport plate 64, effectively inhibiting the migration of the antifreeze solution in the opposite—and undesirable—direction.

It can therefore be seen that by a judicious balance of reactant and coolant pressures, and by wetproofing certain elements within the fuel cell assembly 11, it is possible to utilize a directly fed antifreeze solution in the fuel cell assembly 11 without danger to either the electrolyte 52 or the anode and cathode catalysts, 54 and 56 respectively. As discussed previously, by not requiring that the antifreeze solution be carried within sealed cooler plates, the present invention advantageously allows for fuel cell stacks to be constructed having lower weight and volume parameters than previously possible.

The inputted reactant fuel and oxidant may be fed through the fuel cell assembly 11 utilizing axial feed manifolding, exterior manifolding or a combination of the two—the specific arrangement of manifolding being commonly known to those skilled in the art and not of primary concern with respect to the present invention. As depicted in FIG. 1, the oxidant channels 76 are typically oriented orthogonal to the fuel channels 72, but may alternatively be oriented in any manner provided that the fuel cell assembly 11 is adequately supplied with the proper amount of these reactants, without departing from the broader aspects of the present invention.

An exemplary fuel cell including a PEM electrolyte, wetproofed anode and cathode substrates, 58 and 62, and anode and cathode diffusion layers, 66 and 68, demonstrated efficient test performance without unacceptable adsorption of a glycerol-water antifreeze solution to the anode or cathode catalysts, 54 and 56 respectively. The exemplary fuel cell included a 15 micron PEM electrolyte within a membrane electrode assembly acquired from W. L. Gore and Associates, Inc. of Elkton, Md. as product identification no. "PRIMEA-5560". The anode catalyst consisted of a platinum-ruthenium alloy. The cathode catalyst was platinum.

The porous anode and cathode substrate layers were porous carbon-carbon fibrous composite having a thickness of approximately 0.006–0.007 inches, and a porosity of about 65%–75%, and were acquired as grade TGP-H-060 from the Toray Company of New York, N.Y. The anode and cathode substrate layers were uniformly wetproofed with Teflon grade "FEP-121" sold by the E. I. DuPont Company, of Wilmington, Del., by wet-proofing procedures well-known in the art.

The porous anode and cathode gas diffusion layers were applied to both the anode and cathode substrates by procedures well-known in the art and described in U.S. Pat. No. 4,233,181, which patent is owned by the assignee of all rights in the present invention, and which patent is hereby incorporated herein by reference in its entirety. The anode and cathode diffusion layers were approximately 0.003–0.004 inches thick, and were comprised of about 50 percent Vulcan XC-72 obtained from the Cabot Corporation of Billerica, Mass. and about 50 percent Teflon® (polytetrafluoroethylene), grade "TFE-30", obtained from the aforesaid E. I. DuPont Company.

The cell anode and cathode flow fields were porous and defined within anode and cathode water transport plates. The water transport plates were porous graphite having a mean pore size of approximately 2–3 microns and a porosity of 35%–40%. The plates were made wettable by treating them with tin oxide in a procedure described in U.S. Pat. No. 5,840,414 owned by the assignee of all rights in the present invention, which patent is hereby incorporated herein by reference. The cell had and active area of about 0.4 square feet, a porosity of 35%–40%.

Alternatively, a fuel cell assembly 11 having antifreeze coolant channels formed in only one of the anode and cathode water transfer plates, 60 and 64 respectively, is also contemplated and may be employed without departing from the broader aspects of the present invention.

While a proton exchange membrane, noble metal catalyst and carbon fiber paper having a Teflon® (polytetrafluoroethylene) coating have been described, the present invention is not limited in this regard as other membranes and substrate materials may be alternatively utilized, providing they allow for the necessary flow of reactant and by-product molecules and ions. Likewise, fuel cells having an non-solid acid based electrolyte or other fuel cell configurations, such as are disclosed in commonly assigned U.S. Pat. No. 4,769,297, issued to Reiser et al. and U.S. Pat. No. 5,503,944, issued to Meyer et al., each herein incorporated by reference in their entirety, may also be employed without departing from the broader aspects of the present invention.

With reference once again to FIG. 1, the present invention is directed towards a coolant treatment system for use with a fuel cell assembly 11 which also incorporates a direct antifreeze coolant solution. The coolant channels 78/80 of the fuel cell assembly 11 serve to address two main concerns of an operating fuel cell assembly: the water management of a fuel cell assembly, as well as the thermal management of a fuel cell assembly. In a PEM fuel cell assembly, for example the fuel cell assembly 11 as shown in FIG. 1, the PEM 52 must be sufficiently hydrated for the fuel cell assembly 11 to operate and continue to facilitate the migration of ions across the PEM 52. One manner in which the PEM 52 remains hydrated during operation of the fuel cell assembly 11 is by humidifying either, or both of, the inputted fuel and oxidant streams traveling within the fuel and oxidant channels 72 and 76, respectively.

In operation, it is desired that pure hydrogen be utilized as the fuel supply for the fuel cell assembly 11 shown in FIG. 1, but such pure hydrogen is often expensive to obtain and store. Other hydrocarbons such as methane, natural gas and gasoline are therefore utilized as a fuel, but only after these hydrocarbons have undergone a known reformation process to convert the hydrocarbons to a hydrogen rich fuel having a minimal amount of impurities within the fuel supply.

Reformed hydrocarbon fuels, however, typically contain quantities of ammonia, $NH_3$, and hydrogen, $H_2$, as well as significant quantities of carbon dioxide, $CO_2$. The $NH_3$ and CO₂ gases dissolve and dissociate into the water which may be provided to, and created within, the fuel cell assembly. The gases react with the water and form ionic reaction by-products. In addition, water within the fuel cell assembly 11 containing concentrations of ammonia even as small as 2 parts per million (ppm) can act to displace protons in the PEM 52, thereby reducing the conductivity of the PEM 52 and thus, the efficiency of the fuel cell assembly as a whole. Dissolved gases within the water may also result in gas bubbles in the coolant flow field of the fuel cell assembly 11 which may cause drying of the anode and cathode water transfer plates, 60 and 64 respectively, thereby resulting in mixing of the reactants.

It would therefore be very beneficial to equip a fuel cell assembly 11 with a coolant treatment system that can remove water contamination within the fuel cell assembly 11, and thereby prevents damage to the fuel cell assembly 11 due to the resultant effects of such contamination, as well as providing the fuel cell assembly 11 with a direct antifreeze coolant supply to protect against potentially hazardous temperature extremes.

Figure 2:
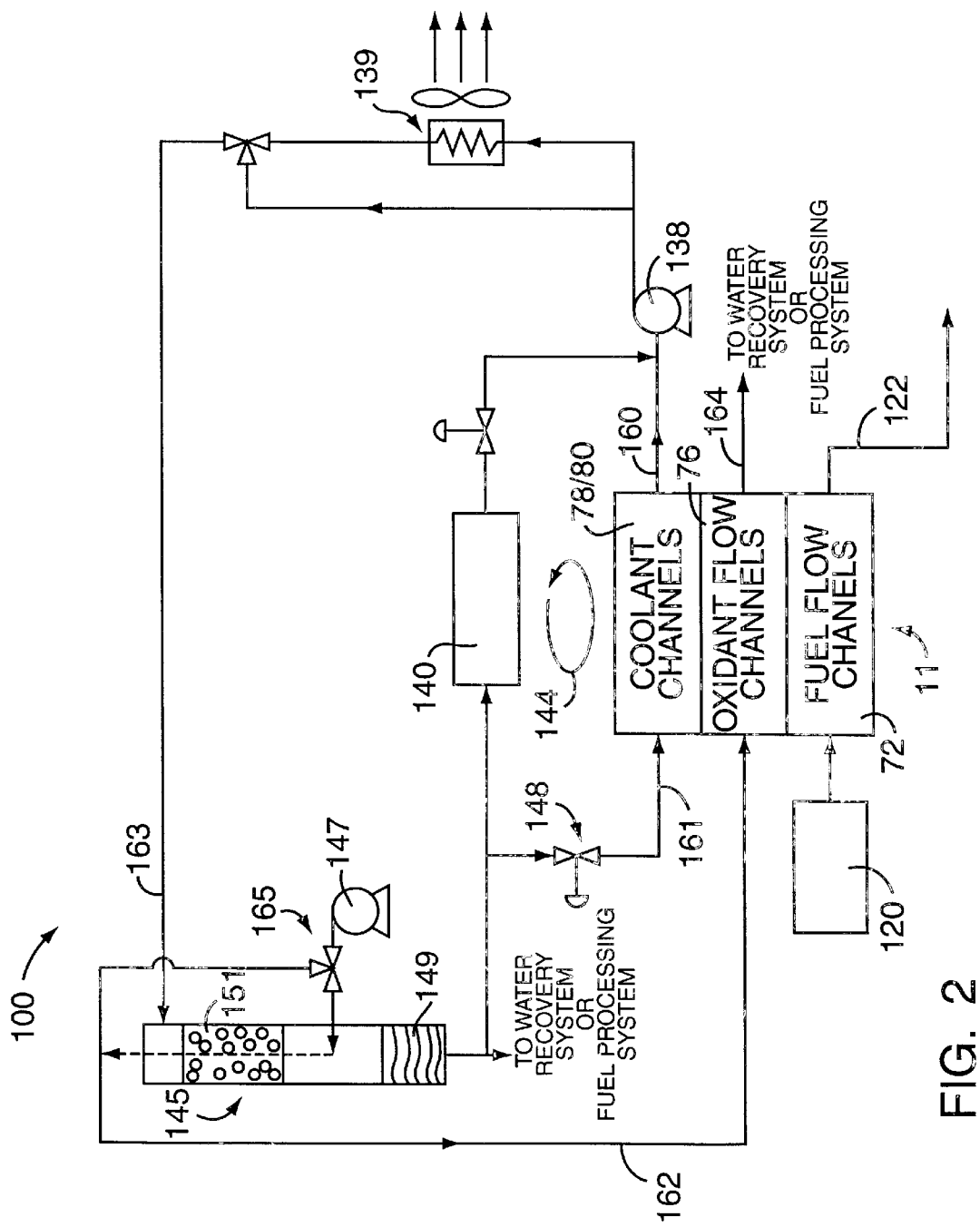
FIG. 2 is a simplified schematic illustration of a coolant treatment system incorporating a direct antifreeze cooled fuel cell assembly according to one embodiment of the present invention.

It is a major aspect of the present invention, therefore, to provide such a coolant treatment system for use with a fuel cell stack 11. FIG. 2 illustrates one such coolant treatment system 100 according to an embodiment of the present invention. Only a single fuel cell assembly 11 is shown in FIG. 2, including coolant channels 78/80, fuel flow channels 72 and oxidant flow channels 76, for simplicity; however, it will be readily apparent that the coolant treatment system 100 is equally applicable to either a single fuel cell assembly 11 or a fuel cell stack comprised of a plurality of electrically coupled fuel cell assemblies.

Still in reference to FIG. 2, a fuel cell assembly 11 receives reactant fuel from a fuel supply component 120, typically from a fuel processing system producing a hydrogen rich fuel. The reactant fuel circulates throughout the fuel cell assembly 11 and exits through a fuel exit conduit 122. The fuel cell assembly 11 is further equipped with an integrated oxidant supply and a direct antifreeze coolant loop 144.

The direct antifreeze coolant loop 144 includes a coolant feed conduit 161 which directs an antifreeze solution to the coolant channels, 78 and 80, of the fuel cell assembly 11. In circulating through the coolant channels 78 and 80, the antifreeze solution absorbs and carries away a portion of the heat generated by the fuel cell assembly 11. In addition, the antifreeze solution serves to carry away a substantial amount of the water by-product which has been formed within the fuel cell assembly 11 during operation. The by-product water, as well as any NH₃ and CO₂, dissolves into the antifreeze solution. Therefore, the by-product water is typically contaminated with dissolved and dissociated gases and, if present, suspended solids.

Upon exhaust from the fuel cell assembly 11, a coolant discharge conduit 160 carries exhausted antifreeze solution from the fuel cell assembly 11 to a coolant pump 138 which, in conjunction with a pressure control valve 148, maintains a predetermined flow rate and pressure of the circulated antifreeze solution. As is well known, the pressure control valve 148 may be set manually, automatically, or, for example, may be electro-mechanically adjusted based upon a reference pressure of the reactant oxidant stream within the fuel cell assembly 11 to thereby restrict flow through the pressure control valve 148 so that the antifreeze coolant stream circulating through the coolant channels, 78 and 80, is at a pressure lower than the pressure of the oxidant stream within the oxidant flow channels 76. Additional pressure control means may include any known mechanism that can reduce pressure of a liquid stream below a reference pressure of a gaseous stream. One such pressure control means is disclosed in commonly-assigned U.S. Pat. No. 5,700,595, issued to Reiser, and hereby incorporated by reference in its entirety.

Returning to FIG. 2, a portion of the exhausted antifreeze solution is fed to a coolant heat exchanger 139, comprising a fan apparatus or the like, which is operable to remove a portion of the absorbed heat from the circulated antifreeze solution. In total, the coolant feed conduit 161, the coolant channels 78 and 80, the coolant heat exchanger 139, the pressure control valve 148 and the coolant discharge conduit 160 comprise elements of the coolant loop 144 for regulating the operating temperature of the fuel cell assembly 11.

The coolant treatment system 100 further provides for the humidification of an inputted oxidant stream by utilizing the water in the coolant supplied by a reclamation conduit 163 for delivery to a degasifier portion 151 of a degasifying apparatus 145. The degasifying apparatus 145 of the present invention is utilized to partially cleanse the coolant and houses a reservoir portion 149 for accumulating such purified coolant. The reservoir portion 149 also accommodates changes in coolant fluid volume due to changes in operating conditions.

In the embodiment shown in FIG. 2, an oxidant source apparatus 147, typically a variable speed blower-pump or the like, is the primary source of reactant oxidant for the oxidant flow channels 76 of fuel cell assembly 11. The oxidant source apparatus 147 does not, however, provide the fuel cell assembly 11 with a supply of oxidant directly, but rather first provides the degasifying apparatus 145 with a supply of oxygen-rich oxidant, typically in the form of air. An oxidant feed conduit 162 serves as a path for feeding a reactant oxidant treated by the degasifying apparatus 145 to the oxidant flow channels 76 of the fuel cell assembly 11.

As is further illustrated in FIG. 2, an oxidant control valve 165 may alternatively be arranged to feed only a fraction of the generated reactant oxidant, typically approximately 3%–7% of the total oxidant flow, to the degasifier portion 151, while the balance is fed directly to the oxidant flow channels 76. An oxidant flow of approximately 3%–7% is typically sufficient to reduce the level of dissolved gases in the coolant to an acceptable level, however the required oxidant flow may need to be correspondingly higher if contamination of the water is excessive.

In operation, the coolant treatment system 100 of FIG. 2 delivers the contaminated by-product water and the antifreeze solution from the coolant pump 138, through a reclamation conduit 163, to the degasifying apparatus 145. The antifreeze solution passes through the degasifier portion 151 in a counter-current manner to the oxidant air which is introduced into the degasifying apparatus 145 below the degasifier portion 151 through the action of the oxidant source apparatus 147. Mass transfer in the degasifier portion 151 results in a significant fraction of the dissolved gases in the antifreeze solution diffusing into the oxidant stream, thus stripping most of the dissolved gases from the antifreeze solution. This results in a purified coolant with an acceptable conductivity and dissolved-gas content. In addition, the oxidant air will become humidified by the counter flowing antifreeze solution, in a manner important to the operation of the fuel cell assembly 11, as discussed previously. The humidified oxidant is transported from the degasifying apparatus 145 by an oxidant feed conduit 162, to be subsequently supplied to the oxidant flow channels 76 of the fuel cell assembly 11. An exhausted oxidant stream, which has circulated through the oxidant flow channels 76, is carried by an oxidant exhaust conduit 164 to be forwarded to an unillustrated water recovery system and/or a fuel processing system.

The degasifying apparatus 145 may be any known mass transfer device capable of effecting mass transfer between a liquid stream and a gas stream. Examples of such mass transfer devices are packed beds, wetted films, spray towers, or the like.

The coolant treatment system 100 shown in FIG. 2, illustrates other water purification devices as well. A demineralizer 140 is configured to accept a portion of the purified antifreeze solution, directed to the fuel cell assembly 11 from the reservoir portion 149, in order to assist in the reduction of suspended solids and dissolved gasses in the coolant. Moreover, an unillustrated secondary heat exchanger may be located upstream of the demineralizer 140 so as to provide the by-product water to the demineralizer 140 at a temperature appropriate for proper functioning of the demineralizer 140, approximately 140° F. or less.

By arranging the demineralizer 140 downstream from the degasifying apparatus 145, the coolant treatment system 100 further reduces the load upon the demineralizer 140 through the reduction of ionizable dissolved gasses such as $CO_2$ which correspondingly increases the life of the demineralizer 140. Likewise, by assisting the degasifying apparatus 145 in the reduction of the contaminants present in the anitfreeze solution, the demineralizer 140 advantageously acts to prolong the life of the degasifying apparatus 145 as well.

It should be readily apparent that the trim valves shown in FIG. 2 are controlled so as to maintain a balance between the heat generated in the fuel cell assembly 11 and the heat rejected to the environment. The antifreeze solution flow rates and the temperature of the antifreeze solution at various locations within the coolant treatment system 100 are controlled to provide efficient operation of the fuel cell assembly 11 and the coolant treatment system 100.

The coolant treatment system of the present invention significantly reduces the amount of dissolved ammonia, carbon dioxide and hydrogen within the coolant of the fuel cell assembly 11. It is therefore a major aspect of the present invention that the oxidant processed by the degasifying apparatus 145 enables removal of the dissolved gases contaminating antifreeze solution, and moreover, that the oxidant supply subsequently provided to the oxidant flow channels 76 will have been previously humidified by the degasifying apparatus 145. In this manner, two considerations important to the operation of the fuel cell assembly 11 are accomplished utilizing a single integrated treatment system.

The coolant treatment system 100 additionally provides for another important aspect of the present invention by utilizing a direct antifreeze solution as the coolant for the fuel cell assembly 11. By doing so, the fuel cell assembly 11 is protected against freezing temperature extremes without the added weight and volume inherent in those systems utilizing separate cooler plates which are sealed from fluid communication with the body of a fuel cell assembly or stack.

Figure 3:
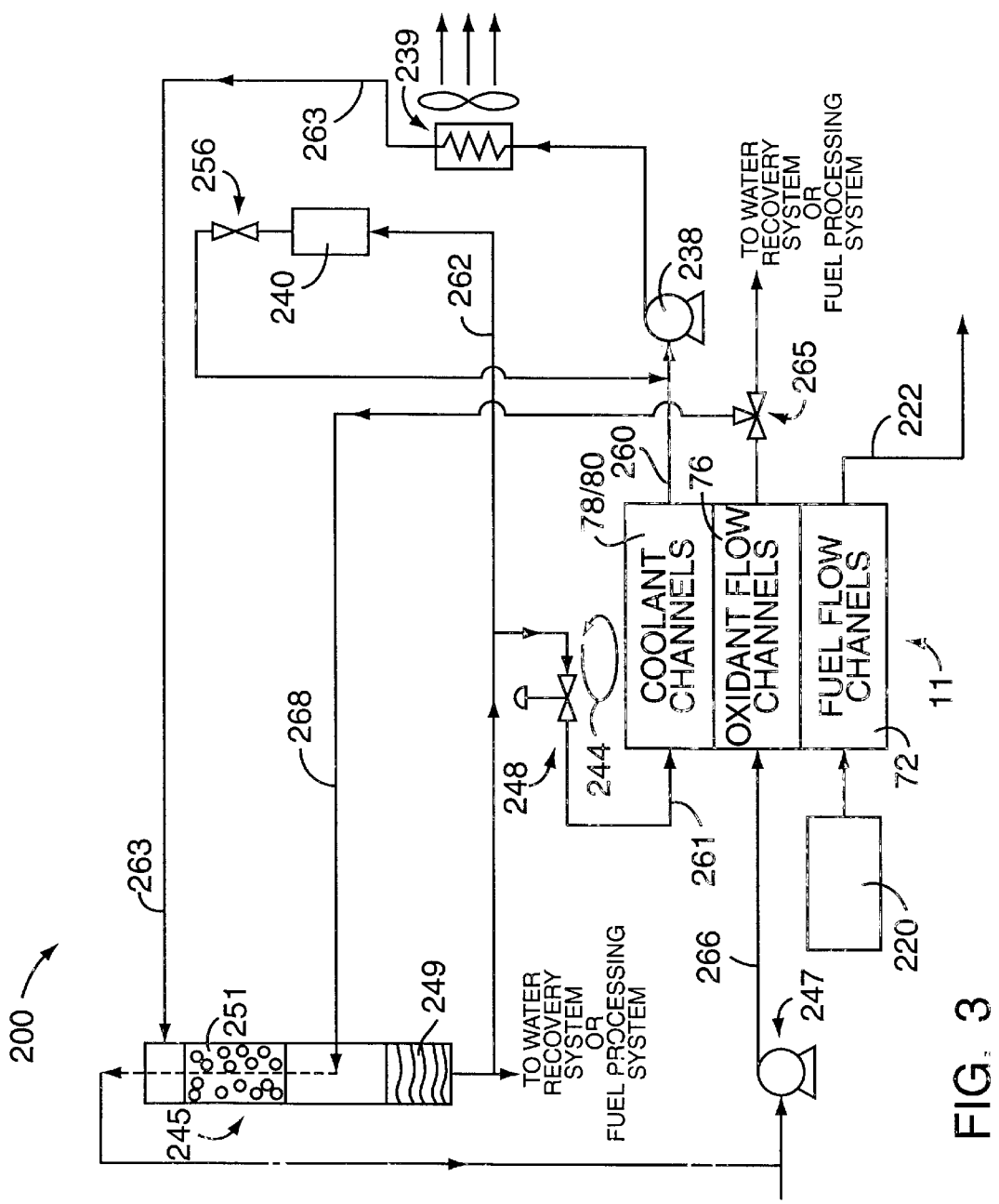
FIG. 3 is a simplified schematic illustration of a coolant treatment system incorporating a direct antifreeze cooled fuel cell assembly according to another embodiment of the present invention.

While FIG. 2 illustrates one possible configuration of an integrated coolant treatment system utilizing a direct antifreeze solution, it should be readily apparent that other, alternative configurations are also envisioned by the present invention. FIG. 3 illustrates one such alternative embodiment of a coolant treatment system of the present invention, generally indicated by the numeral 200.

As depicted in FIG. 3, only a single fuel cell assembly 11 is shown incorporated in the coolant treatment system 200, including coolant channels 78/80, fuel flow channels 72 and oxidant flow channels 76, for simplicity; however, it will be readily apparent that the coolant treatment system 200 is equally applicable to either a single fuel cell assembly 11 or a fuel cell stack comprised of a plurality of electrically coupled fuel cell assemblies.

Still in reference to FIG. 3, a fuel cell assembly 11 receives reactant fuel from fuel supply component 220, typically as the result of the output from a fuel processing system producing a hydrogen rich fuel. The reactant fuel circulates throughout the fuel cell assembly 11 and exits through a fuel exit conduit 222. The fuel cell assembly 11 is further equipped with an integrated oxidant supply and a direct antifreeze coolant loop 244.

The direct antifreeze coolant loop 244 includes a coolant feed conduit 261 which directs an antifreeze solution to the coolant channels, 78 and 80, of the fuel cell assembly 11. In circulating through the coolant channels 78 and 80, the antifreeze solution absorbs and carries away a portion of the heat generated by the fuel cell assembly 11. In addition, the antifreeze solution serves to carrying away a substantial amount of the water by-product which has been formed within the fuel cell assembly 11 during operation. The by-product water, as well as any $NH_3$ and $CO_2$, dissolves into the antifreeze solution. Therefore, the by-product water is typically contaminated with dissolved and dissociated gases and, if present, suspended solids, as discussed previously.

Upon discharge from the fuel cell assembly 11, a coolant discharge conduit 260 carries exhausted antifreeze solution from the fuel cell assembly 11 to a coolant pump 238 which, in conjunction with a pressure control valve 248, maintains a predetermined flow rate and pressure of the circulated antifreeze solution. As was discussed previously in conjunction with FIG. 2, the pressure control valve 248 may be set manually, automatically, or, for example, may be electromechanically adjusted based upon a reference pressure of the reactant oxidant stream within the fuel cell assembly 11 to thereby restrict flow through the pressure control valve 248 so that the antifreeze coolant stream circulating through the coolant loop 244 is at a pressure lower than the pressure of the oxidant stream within the oxidant flow channels 76.

Returning to FIG. 3, a portion of the antifreeze solution exhausted from the fuel cell assembly 11 is fed to a coolant heat exchanger 239, comprising a fan apparatus or the like, which is operable to remove a portion of the absorbed heat from the circulated antifreeze solution. In total, the coolant feed conduit 260, the coolant channels 78 and 80, the coolant heat exchanger 239 and the pressure control valve 248 operate as the coolant loop 244 for regulating the operating temperature of the fuel cell assembly 11.

The coolant treatment system 200 further provides for the humidification of an oxidant stream by utilizing the water present in the coolant supplied by a reclamation conduit 263 for delivery to a degasifier portion 251 of a degasifying apparatus 245. The degasifying apparatus 245 of the present invention is utilized to partially cleanse the coolant and houses a reservoir portion 249 for accumulating such purified coolant. The reservoir portion 249 is situated downstream of the reclamation conduit 263 for accepting the antifreeze solution, which contains contaminated by-product water that has been carried from the fuel cell assembly 11 along with the circulated antifreeze solution. The reservoir portion 249 also accommodates changes in coolant fluid volume due to changes in operating conditions.

The reservoir portion 249 is situated downstream of a reclamation conduit 263 for accepting a measured amount of the contaminated antifreeze solution that has been carried from the fuel cell assembly 11. The reservoir portion 249 also accommodates changes in coolant fluid volume due to changes in operating conditions.

An oxidant source apparatus 247, typically a variable speed blower-pump or the like, is the primary source of reactant oxidant for the oxidant flow channels 76 of fuel cell assembly 11. In contrast to the embodiment disclosed in FIG. 2, the oxidant source apparatus 247 supplies the fuel cell assembly 11 with a supply of oxygen-rich oxidant directly by way of an oxidant supply conduit 266. An oxidant control valve 265 is utilized to divert a portion of the exhausted oxidant, typically approximately 3%–7% of the total oxidant flow, to the degassifier portion 251, while the balance of the exhausted oxidant is fed to either the water recovery system or the fuel processing system (not shown). The unillustrated water recovery system may include a condensing heat exchanger or other appropriate means for recovering water from the exhausted oxidant stream.

In operation, the coolant treatment system 200 of FIG. 3 delivers the contaminated antifreeze solution through the reclamation conduit 263 to the degasifying apparatus 245. The coolant passes through the degasifier portion 251 in a counter-current manner to the oxidant air which is introduced, via an oxidant input conduit 268, into the degasifying apparatus 245 below the degasifier portion 251. Mass transfer in the degasifier portion 251 results in a significant fraction of the dissolved gases in the coolant diffusing into the oxidant stream, thus stripping most of the dissolved gases from the water. This process results in a purified coolant with an acceptable conductivity and dissolved-gas content, while the now-humidified oxidant stream is fed back to the oxidant source apparatus 247 for subsequent supply to the fuel cell assembly 11.

The degasifying apparatus 245 may be any known mass transfer device capable of effecting mass transfer between a liquid stream and a gas stream. Examples of such mass transfer devices are packed beds, wetted films, spray towers, or the like.

The coolant treatment system 200 shown in FIG. 3 illustrates other coolant purification devices as well. A demineralizer 240 is supplied through a trim conduit 262 with a portion of the purified coolant from the reservoir portion 249 according to the action of a water trim valve 256, for the reduction of suspended and dissolved gasses and, if present, suspended solids, in the purified water.

By arranging the demineralizer 240 downstream from the degasifying apparatus 245, the coolant treatment system 200 further reduces the load upon the demineralizer 240 through the reduction of ionizable dissolved gasses such as $CO_2$ which correspondingly increases the life of the demineralizer 240. Likewise, by assisting the degasifying apparatus 245 in the reduction of the contaminants present in the anitfreeze solution, the demineralizer 240 advantageously acts to prolong the life of the degasifying apparatus 245 as well.

It should be readily apparent that the trim valves shown in FIG. 3 are controlled so as to maintain a balance between the heat generated in the fuel cell assembly 11 and the heat rejected to the environment. The antifreeze solution flow rates and the antifreeze solution temperatures at various locations within the coolant treatment system 200 are controlled to provide efficient operation of the fuel cell assembly 11 and the coolant treatment system 200.

It is a major aspects of the preferred embodiment of FIG. 3 that at least a portion of the inputted oxidant stream be subjected to humidification process each time before being presented to the fuel cell assembly. In addition, since all of the coolant fed to the demineralizer 240 will already have been passed through the degasifier 245, the configuration of FIG. 3 provides for improved cleansing of any dissolved gases from the water, and therefore improved fuel cell operation and longevity. Moreover, the demineralizer 240 will also enjoy a longer usable life span due to the reduction in contaminants the demineralizer 240 must remove.

The coolant treatment system of FIG. 3 significantly reduces the amount of ammonia, carbon dioxide and hydrogen within the coolant stream of the fuel cell assembly 11. Consequently, according to a major aspect of the present invention, buildup of these gases within the fuel cell assembly 11 can be reduced, as well as extending the time between maintenance on the demineralization apparatus 240.

In accordance with an important aspect of the present invention, and similar to FIG. 2's disclosed embodiment, FIG. 3 depicts an integrated coolant treatment system utilizing a direct antifreeze solution. Such a configuration protects the fuel cell assembly 11 from freezing temperature extremes without the added weight and volume inherent in those systems utilizing separate cooler plates which are sealed from fluid communication with the body of a fuel cell assembly or stack. Moreover, by equipping a fuel cell assembly or stack with a direct antifreeze solution, the start-up time for a cold or frozen fuel cell assembly or stack is correspondingly reduced.

As can be seen from the foregoing disclosure and figures in combination, a coolant treatment system according to the present invention is advantageously provided with a plurality of beneficial operating attributes, including but not limited to: humidifying the inputted oxidant stream, maintaining the fuel cell assembly coolant system above its freezing point or quickly raising a cold or frozen fuel cell assembly above freezing, lessening the weight and volume of a temperature-protected fuel cell assembly or stack and cleansing the coolant within the overall system to remove potentially harmful and debilitating contamination. All of these attributes contribute to the efficient operation of a fuel cell assembly and are especially beneficial to those applications, such as motor vehicle manufacturing, which demand high performance, reliability and low volume and weight.

While the invention had been described with reference to the preferred embodiments, it will be understood by those skilled in the art that various obvious changes may be made, and equivalents may be substituted. for elements thereof, without departing from the essential scope of the present invention. Therefore, it is intended that the invention not be limited to the particular embodiments disclosed, but that the invention includes all embodiments falling within the scope of the appended claims.

What is claimed is:

1. A coolant treatment system for a fuel cell power plant having a plurality of electrochemical fuel cell assemblies in electrical connection with each other, said fuel cell assemblies each having an electrolyte, an anode, a cathode, each of said anode and said cathode are adapted to support anode and cathode water transport plates through which a fuel and an oxidant are fed to said anode and said cathode, respectively, one of said anode and cathode water transport plates being adapted to support a coolant channel through which an antifreeze solution is circulated, said system comprising:

an oxidant source for providing said fuel cell power plant with said oxidant;

a coolant conduit through which said antifreeze solution is exhausted from said fuel cell power plant;

a degasifying apparatus which accepts said oxidant and said antifreeze solution for subsequent interaction with one another thereby treating both said oxidant and said antifreeze solution by removing contaminants from said antifreeze solution and by humidifying said oxidant, said degasifying apparatus providing said fuel cell power plant with said humidified oxidant; and wherein said antifreeze solution is in fluid communication with one of said anode and cathode water transport plates.

2. The coolant treatment system for a fuel cell power plant according to claim 1, wherein:

said degasifying apparatus further comprises:

an oxidant inlet for receiving said oxidant prior to said oxidant being fed to said fuel cell power plant;

a degasifier portion to which said antifreeze solution and said oxidant are provided, said degasifier portion enabling said interaction of said antifreeze solution and said oxidant to thereby treat said antifreeze solution by removing dissolved gases from said antifreeze solution while humidifying said oxidant; and a reservoir portion for collecting said treated antifreeze solution.

3. The coolant treatment system for a fuel cell power plant according to claim 2, wherein:

said antifreeze solution comprises water and an organic antifreeze; and said dissolved gases comprise at least one of ammonia, carbon dioxide and hydrogen gases.

4. The coolant treatment system for a fuel cell power plant according to claim 2, wherein:

said antifreeze solution is an alkanetriol antifreeze solution.

5. The coolant treatment system for a fuel cell power plant according to claim 4, wherein:

said alkanetriol antifreeze solution is selected from the group consisting of glycerol, butanetriol and pentanetriol.

6. The coolant treatment system for a fuel cell power plant according to claim 2, wherein:

said fuel cell assemblies each further include an anode catalyst layer adjacent one side of said electrolyte and a cathode catalyst layer adjacent another side of said electrolyte;

said anode support is wetproofed and positioned between said anode water transport plate and said anode catalyst; and said cathode support is wetproofed and positioned between said cathode water transport plate and said cathode catalyst.

7. The coolant treatment system for a fuel cell power plant according to claim 6, wherein:

said antifreeze solution comprises a non-volatile antifreeze which does not wet said anode support and said cathode support.

8. The coolant treatment system for a fuel cell power plant according to claim 6, wherein:

said coolant treatment system further comprises:

a coolant heat exchanger located along said coolant conduit for removing heat from a selected portion of said antifreeze solution; and a demineralization device for purifying a selected portion of said antifreeze solution at a point after said antifreeze solution has been treated by said degasifying apparatus.

9. A coolant treatment system for a fuel cell power plant having a plurality of electrochemical fuel cell assemblies in electrical connection with each other, said fuel cell assemblies each having an electrolyte, an anode, a cathode, each of said anode and said cathode are adapted to support anode and cathode water transport plates through which fuel and oxidant are fed to said anode and said cathode, respectively, one of said anode and cathode water transport plates being adapted to support a coolant channel through which an antifreeze solution is circulated, said system comprising:

a coolant conduit through which said antifreeze solution is exhausted from said fuel cell power plant;

an oxidant source for providing said fuel cell power plant with said oxidant, said oxidant being exhausted from said fuel cell power plant after circulation therethrough;

a degasifying apparatus which accepts said antifreeze solution and a predetermined quantity of said oxidant for subsequent interaction with one another thereby treating both said antifreeze solution by removing contaminants from said antifreeze solution and said oxidant by humidifying said oxidant, said degasifying apparatus providing said fuel cell power plant with said humidified oxidant; and wherein said antifreeze solution is in fluid communication with one of said anode and cathode water transport plates.

10. The coolant treatment system for a fuel cell power plant according to claim 9, wherein:

said degasifying apparatus further comprises:

an exhausted oxidant inlet for accepting said oxidant exhausted from said fuel cell power plant;

a degasifier portion to which said antifreeze solution and said oxidant are provided, said degasifier portion enabling said interaction between said antifreeze solution and said oxidant to thereby treat said antifreeze solution by removing dissolved gases from said antifreeze solution; and a reservoir portion for collecting said antifreeze solution treated by said degasifying apparatus.

11. The coolant treatment system for a fuel cell power plant according to claim 10, wherein:

said antifreeze solution comprises water and an organic antifreeze; and said dissolved gasses comprise at least one of ammonia, carbon dioxide and hydrogen gases.

12. The coolant treatment system for a fuel cell power plant according to claim 10, wherein:

said antifreeze solution is an alkanetriol antifreeze solution.

13. The coolant treatment system for a fuel cell power plant according to claim 12, wherein:

said alkanetriol antifreeze solution is selected from the group consisting of glycerol, butanetriol and pentanetriol.

14. The coolant treatment system for a fuel cell power plant according to claim 10, wherein:

said fuel cell assemblies each further include an anode catalyst layer adjacent one side of said electrolyte and a cathode catalyst layer adjacent another side of said electrolyte;

said anode support is wetproofed and positioned between said anode water transport plate and said anode catalyst; and said cathode support is wetproofed and positioned between said cathode water transport plate and said cathode catalyst.

15. The coolant treatment system for a fuel cell power plant according to claim 14, wherein:

said antifreeze solution comprises a non-volatile antifreeze which does not wet said anode support and said cathode support.

16. The coolant treatment system for a fuel cell power plant according to claim 14, wherein:

said coolant treatment system further comprises:
a coolant heat exchanger located along said coolant conduit for removing heat from a selected portion of said antifreeze solution; and
a demineralization device for purifying a selected portion of said antifreeze solution at a point after said antifreeze solution has been treated by said degasifying apparatus.

17. A method of providing a coolant treatment system to a fuel cell power plant having a plurality of electrochemical fuel cell assemblies in electrical connection with each other, said fuel cell assemblies each having an electrolyte, an anode, a cathode, each of said anode and said cathode are adapted to support anode and cathode water transport plates through which fuel and oxidant are circulated to said anode and said cathode, respectively, one of said anode and cathode water transport plates being adapted to support a coolant channel through which an antifreeze solution is circulated, said method comprising the steps of:

adapting said coolant channels so as to be in fluid communication with said anode and said cathode water transport plates;

exhausting said antifreeze solution from said fuel cell power plant;

providing an oxidant supply; and providing a degasifying apparatus with said exhausted antifreeze solution and said oxidant; and operating said degasifying apparatus so as to remove contaminants from said antifreeze solution.

18. The method of providing a coolant treatment system to a fuel cell power plant according to claim 17, said method further comprising the steps of:

directing said oxidant to said degasifying apparatus prior to said fuel cell power plant being provided with said oxidant;

providing a degasifier portion of said degasifying apparatus with said oxidant and said antifreeze solution to thereby treat said antifreeze solution by removing dissolved gases from said antifreeze solution while humidifying said oxidant; and arranging a demineralization device downstream of said degasifying apparatus.

19. The method of providing a coolant treatment system to a fuel cell power plant according to claim 17, said method further comprising the steps of:

exhausting oxidant from said fuel cell power plant;

directing a selected portion of said oxidant exhausted from said fuel cell power plant to said degasifying apparatus;

providing a degasifier portion of said degasifying apparatus with said selected portion of said exhausted oxidant and said antifreeze solution to thereby treat said antifreeze solution by removing dissolved gases from said antifreeze solution while humidifying said selected portion of said oxidant; and arranging a demineralization device downstream of said degasifying apparatus for purification of a selected portion of said antifreeze solution.

* * * * *